United States Patent [19]
Herron et al.

[11] 3,825,824
[45] July 23, 1974

[54] MATRIX SCANNING CIRCUIT FOR TESTING A MULTIPLICITY OF CIRCUIT PATHS

[75] Inventors: Roger G. Herron, Clearwater, Fla.; Stanley F. Hon, Morton Grove, Ill.

[73] Assignee: GTE Automatic Electric Laboratories Incorporated, Northlake, Ill.

[22] Filed: June 1, 1973

[21] Appl. No.: 366,222

[52] U.S. Cl............. 324/51, 340/147 T, 340/166 R
[51] Int. Cl............................................. G01r 31/02
[58] Field of Search....... 324/51, 66, 73; 340/147 T, 340/166 R, 176

[56] References Cited
UNITED STATES PATENTS

| | | | |
|---|---|---|---|
| 3,348,138 | 10/1967 | Palmentiero | 324/51 |
| 3,427,538 | 2/1969 | Bohnenblust | 324/66 |
| 3,441,849 | 4/1969 | Bennett et al. | 324/51 X |
| 3,500,457 | 3/1970 | Curley | 324/51 X |
| 3,609,538 | 9/1971 | Schag | 324/66 |
| 3,665,299 | 5/1972 | Yarbrough | 324/73 X |
| 3,705,349 | 12/1972 | Arnold | 324/51 X |
| 3,740,644 | 6/1973 | Schag et al. | 324/66 |

Primary Examiner—Gerard R. Strecker
Attorney, Agent, or Firm—Robert F. Van Epps

[57] ABSTRACT

A diode matrix scan circuit having $m + n$ inputs and $m \times n$ outputs for testing $m \times n$ circuit paths in $m + n$ operations of a scanning rotary switch.

7 Claims, 2 Drawing Figures

MATRIX SCANNING CIRCUIT FOR TESTING A MULTIPLICITY OF CIRCUIT PATHS

BACKGROUND OF THE INVENTION

1. Field of the Invention

The present invention relates generally to the field of circuit path testing devices and more particularly to a new and improved matrix scan circuit for testing a multiplicity of circuit paths.

2. Description of the Prior Art

Prior to the present invention a variety of arrangements have been devised for testing a multiplicity of circuit paths such as are found in completed cable assemblies. Traditional methods for testing multiple conductive paths for open or shorted conditions generally require a minimum of one test operation for each conductive path to be tested. Thus as the number of paths increases the time required to effect the testing increases proportionately.

Some measures have been taken to reduce the number of testing operations involved, such as series connecting a plurality of paths to be tested as described in U.S. Pat. No. 3,594,635. It will be seen, however, that detection of a fault in the series connected string of circuits necessitates the individual testing of the individual circuits to isolate the fault.

OBJECTS AND SUMMARY OF THE INVENTION

From the preceding discussion it will be understood that among the various objectives of the present invention are included:

the provision of a new and improved apparatus for testing a multiplicity of circuit paths for an open or short condition; and the provision of an apparatus of the above-described character whereby the circuit paths are tested with a minimum of testing operations.

These and other objectives of the present invention are efficiently achieved by providing an electronic diode matrix having $m + n$ inputs and $m \times n$ outputs for testing $m \times n$ circuit paths. The inputs of the matrix circuit are connected to a double pole rotary switch and the outputs are coupled via the circuit paths to be tested to an indicator matrix having n-indicators per row and m rows. Scanning of the n-inputs serially actuates the column indicators and actuation of the m-inputs serially actuates the row indicators. A deviation from this preselected pattern indicates a fault in the unit under test.

The foregoing as well as other objects, features and advantages of the present invention will become more apparent from the following detailed description taken in conjunction with the appended drawings.

DESCRIPTION OF THE PREFERRED EMBODIMENT

Figure 1:
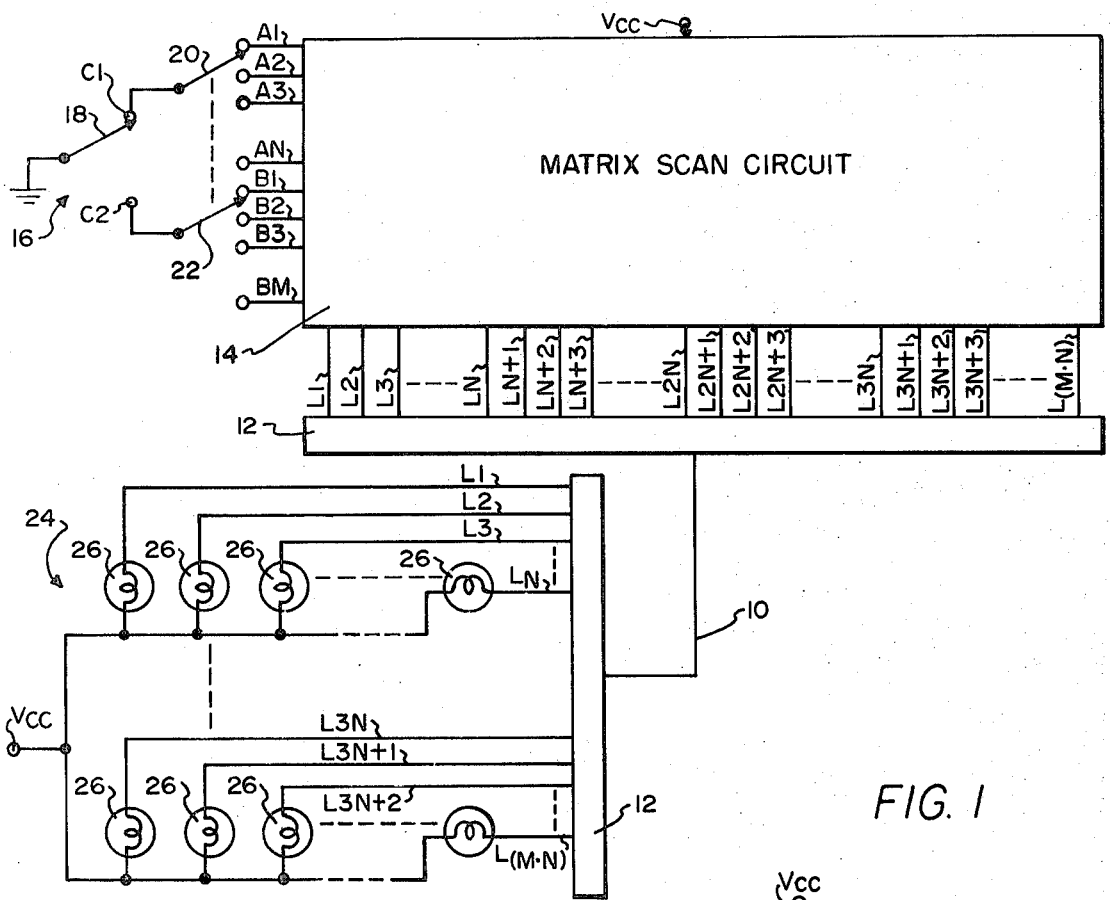
FIG. 1 is a partial schematic illustration of a circuit path testing apparatus in accordance with the present invention.

With reference now to FIG. 1 there is illustrated a testing apparatus adapted to test for opens and shorts in a cable assembly, including a multiple conductor ($m \times n$) cable 10 with connectors 12 at either end thereof. A matrix scan circuit 14 to be presently described has $m + n$ inputs A1 through AN and B1 through BM which are connected to a scanning arrangement 16. The scanning arrangement includes a single pole, two position switch having contact 18 grounded at one end and switchable between first and second positions C1 and C2. A first contact 20 of a two pole rotary switch is connected to position C1 and is switchable among matrix inputs A1 through AN and the second rotary switch contact 22 is connected to position C2 and is switchable among matrix inputs B1 through BM.

The matrix scan circuit has $m \times n$ outputs L1 through $L(m \times n)$ which are connected to the cable 10 under test. The other end of the cable 10 is connected to the inputs L1 through $L(m \times n)$ of an indicator matrix 24 having $m \times n$ indicators shown as lamps 26. It is preferred in the practice of the present invention that the lamps be arranged with n lamps per row and m rows and that they be coupled to a common voltage bus, VCC.

Figure 2:
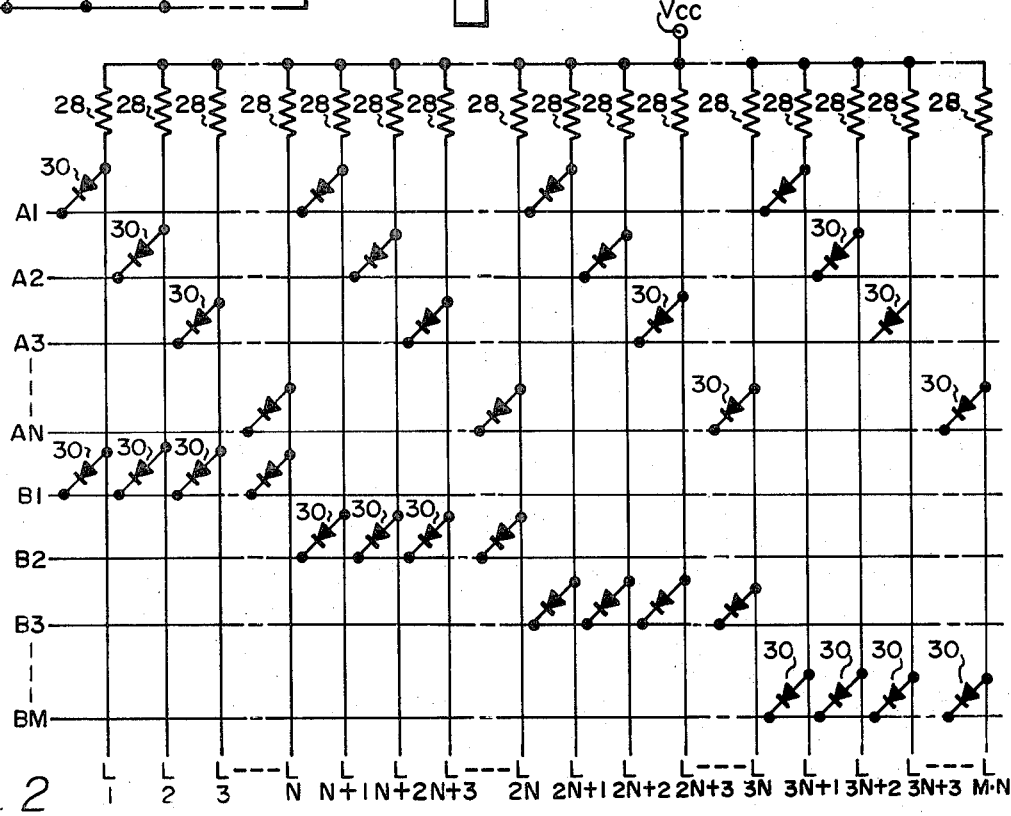
FIG. 2 is a more detailed partial schematic illustration of the matrix scan circuit portion of the apparatus of FIG. 1.

Turning now to FIG. 2 a partial schematic view of a matrix scan circuit of utility in the apparatus of FIG. 1 is shown. As stated above the circuit has $m + n$ inputs which are designated in FIG. 2 as n-inputs A1 to AN and m-inputs B1 to BM. These designations correspond to the possible combinations of positions in which the contacts of the rotary switch of FIG. 1 may be at any given time. For example, input A1 would indicate that contact 18 is in the C1 position and contact 20 is switched to the A1 matrix input. B2 would indicate that contact 18 is in the C2 position and contact 22 is switched to the B2 matrix input. The matrix outputs L1 through $L(m \times n)$ are normally at a relatively high voltage level (logic 1) which is supplied from a voltage source, Vcc through pull up resistors 28. The matrix outputs are selectively coupled to the inputs through diodes 30 in a manner similar to that used for encoding or decoding as in a read only memory. When an input is grounded via the canning arrangement 16 the outputs coupled to that input are pulled low (logic 0).

From FIGS. 1 and 2 it will be seen that when any given matrix input; e.g. A1, is grounded through contact 20, m outputs; e.g. L1, LN+1, L2N+1, L3N+1, etc. are pulled to a logic 0. Similarly, when any matrix input; e.g., B2 is grounded through contact 22, n outputs, e.g., LN+1 through L2N, are pulled to a logic 0. A current path is thus established from the indicator matrix common voltage bus Vcc, through the indicators 26, through the cable 10, matrix diodes 30 and rotary switch to ground.

When the double pole rotary switch is scanned to ground one matrix input at a time in succession a different set of m outputs are pulled low each time. When switch contact 18 is in the C1 position and contact 20 is scanned through matrix inputs A1 to AN, only the column lamps in the indicator matrix are actuated (from left to right in the illustrated arrangement). When contact 18 is switched to the C2 position and contact 22 is scanned through matrix inputs B1 to BM, only the row lamps in the indicator matrix are actuated (from top to bottom in the embodiment shown). Any deviation from this pattern indicates that there is a defect (open or short) in the unit under test. All $m \times n$ conductors or circuits of the cable or unit under test are thus checked in $m + n$ test operations.

By way of illustrative example, one constructed embodiment of the present invention was used to test a 120 conductor cable assembly. Whereas conventional testing apparatus would require 120 separate test operations, the apparatus of the present invention provides complete testing of the cable in only 22 operations ($m=10$ and $n=12$).

From the foregoing discussion it will be seen that the Applicants have provided a new and novel apparatus for testing a multiplicity of circuit paths whereby the objectives set forth hereinabove are efficiently achieved. Since certain changes in the above-described construction will occur to those skilled in the art without departure from the scope of the invention it is intended that all matter set forth in the above-description or shown in the appended drawings shall be interpreted as illustrative and not in a limiting sense.

Having described what is new and novel and desired to secure by Letters Patent, what is claimed is:

1. Apparatus for testing a plurality of $m \times n$ circuit paths for defective open and shorted conditions, said apparatus comprising a matrix scan circuit having $m + n$ inputs and $m \times n$ outputs, means for connecting one end of each of said circuit paths to a corresponding one of said matrix scan circuit outputs, an indicator matrix having $m \times n$ indicator elements, means for connecting the other end of each of said circuit paths to a corresponding one of said indicator elements, a source of electric potential coupled to each of said indicator elements, scanning means selectively coupled to the inputs of said matrix scan circuit and to the reference of said electric potential source for providing a selected plurality of current paths from said electric potential source through said indicator matrix, said circuit paths and said matrix scan circuit to each input of said matrix scan circuit to thereby selectively actuate a corresponding plurality of said indicator elements, said matrix scan circuit being arranged such that coupling of said scanning means to any n-input of said matrix scan circuit provides a corresponding plurality of m current paths and coupling of said scanning means to any m-input of said matrix scan circuit provides a corresponding plurality of n current paths, and means for sequentially scanning said scanning means among said matrix scan circuit m-inputs and n-inputs to thereby sequentially actuate corresponding pluralities of said indicator elements, a failure of any given indicator to actuate being indicative of a defect in a corresponding circuit path.

2. Apparatus as recited in claim 1 wherein
   said matrix scan circuit comprises a diode matrix having each $n$-input coupled to a plurality of $m$ outputs and each $m$-input coupled to a plurality of $n$ outputs through a plurality of diodes having the cathodes thereof coupled to said input and the anodes thereof each coupled to a corresponding one of said outputs.

3. Apparatus as recited in claim 2 wherein
   said source of electric potential is coupled to the anode of each said diode in said matrix, and
   said scanning means is coupled between said matrix scan circuit inputs and ground potential.

4. Apparatus as recited in claim 3 further including a plurality of $m \times n$ pull up resistors connected between said source of electric potential and said diodes.

5. Apparatus as recited in claim 1 wherein
   said indicator elements are arranged in $n$-rows and $m$-columns and are connected through said circuit paths to said matrix scan circuit outputs such that coupling of said scanning means to any n-input of said matrix scan circuit operates to selectively actuate all of said indicator elements in a predetermined column of said indicator matrix, and coupling of said scanning means to any m-input of said matrix scan circuit operates to selectively actuate all of said indicator elements in a predetermined row of said indicator matrix.

6. Apparatus as recited in claim 5 wherein
   said indicator elements are visual indicators.

7. Apparatus as recited in claim 1 wherein
   said scanning means comprises a two pole rotary switch having a first contact switchable among said matrix scan circuit $n$-inputs and a second contact switchable among said matrix scan circuit $m$-inputs, and a single pole two position switch having a contact connected at one side to ground potential and switchable between said first and second contacts of said rotary switch.

* * * * *